Sept. 27, 1927.  
F. HUMPHRIS  
METHOD OF CONSTRUCTION OF BEARER PLATES FOR USE IN PRESSES AND LIKE MACHINES  
Filed Nov. 8, 1926
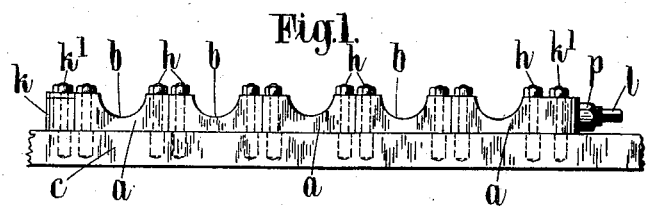
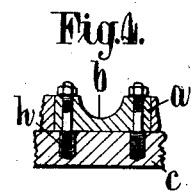
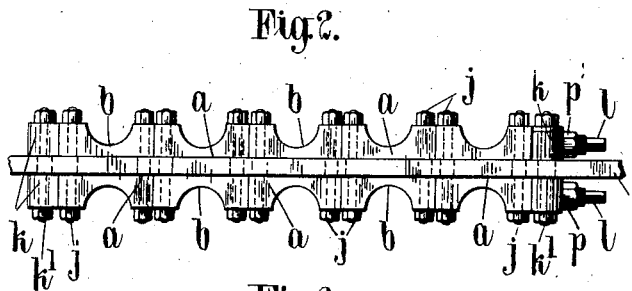
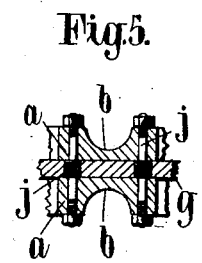
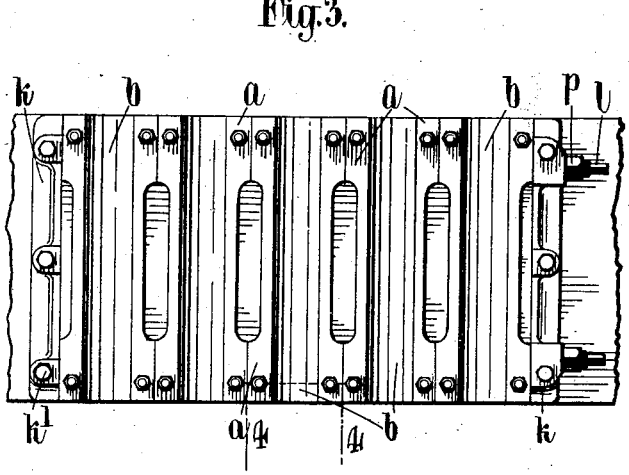
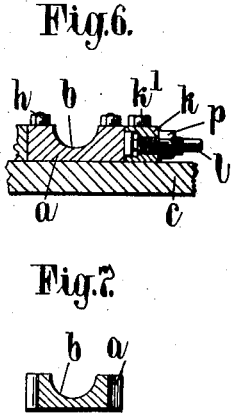
INVENTOR  
*Frank Humphris*
BY  
ATTORNEY Sept. 27, 1927.

F. HUMPHRIS

METHOD OF CONSTRUCTION OF BEARER PLATES FOR USE IN PRESSES AND LIKE MACHINES

Filed Nov. 8, 1926    2 Sheets-Sheet 2

1,643,893

INVENTOR
Frank Humphris
BY
ATTORNEY

Patented Sept. 27, 1927.

1,643,893

UNITED STATES PATENT OFFICE.

FRANK HUMPHRIS, OF PARKSTONE, ENGLAND.

METHOD OF CONSTRUCTION OF BEARER PLATES FOR USE IN PRESSES AND LIKE MACHINES.

Application filed November 8, 1926, Serial No. 147,148, and in Great Britain October 21, 1925.

This invention relates to a new or improved method of construction of bearer-plates for use in presses and like machines to be used in substitution for the multi-grooved kind of bearer-plate in one piece referred to in Patent Number 1,473,478, dated November 6, 1923, wherein bearer-plates consisting of one piece are provided with two or more semi-circular grooves cut in one or opposite plane faces thereof, which semi-circular grooves are, in one form, provided with liners. It has, however, been found both expensive and difficult to produce true grooves in such bearer-plates or so that each groove is absolutely like each other groove, particularly as they have to be semi-circular in cross-section and with the walls of any one groove parallel to the walls of any other groove and of the same depth. It is therefore evident that no correction of any machining error which may have occurred in the depth, parallelism or otherwise of the said semi-circular grooves can be made; and under these circumstances it is necessary to machine them to very fine limits and, in practice, it is often found that only one edge-pressure-plate of a set provided to coact therein takes all the load, whereas this load should be distributed over all the said edge-pressure-plates and all the said grooves in a bearer-plate. To overcome this difficulty and to provide accurately made bearer-plates which will eliminate the hereinbefore referred to disadvantages is the object of this invention.

This invention relates to bearer-plates or the equivalents therefor embodying any independent holder-plate or base which has one or more bearer-blocks secured thereon, all the parts of which are constructed in the manner hereinafter described. Each bearer-block made according to this invention must be provided with or have sunk in any face thereof a so-called semi-circular groove of such absolute form that, when a true cylinder of the correct diameter is placed therein, it will make contact with the whole of the surface of said groove, and any bearer-plate embodying this invention may include any number of these bearer-blocks attached to or mounted on an independent holder-plate or base in the manner hereinafter described. To ensure accuracy and to detect and reject faulty material during manufacture, the bearer-blocks are preferably produced in pairs, in one case from one piece of metal or material and in another case from two pieces of metal or material, preferably, but not necessarily, in the manner hereinafter described.

A method which in practice has proved the most satisfactory is to bore or perforate a single or unit piece of metal or material and then, after its exterior faces are finished, to divide it into two bearer-blocks.

An alternative method is to make two bearer-blocks from two pieces of metal or material, previously faced so that they can be clamped together, and then bore them and finish their exterior faces.

The bearer-blocks are preferably secured to an independent holder-plate or base by means of screwed-members of known form or by screwed-members as shown in Figures 10 and 11 of the drawings. In addition means are also provided whereby the bearer-blocks can be adjustably clamped together between clamping-brackets or bars on the independent holder-plate or base at their correct pitch-distance apart.

The present invention is a radical departure from the methods usually employed in the known kinds of presses and like machines for the production of bearer-plates, and it will be obvious that various modifications may be employed for the manufacture of bearer-plates embodying the chief lines of construction hereinafter referred to. In order to give clear understanding, the invention will now be described with reference to the accompanying drawings. It is to be understood however that the illustrations are merely given by way of example.

In these drawings:—

Figure 1 is a front elevation of part of an independent holder-plate or base having a single row or set of bearer-blocks.

Figure 2 is a front elevation of part of an intermediate independent holder-plate having two rows or sets of bearer-blocks mounted thereon.

Figure 3 is a plan view of either Figure 1 or 2.

Figure 4 is a sectional elevation of the arrangement shown in Figure 1 on the dotted line 4—4, Figure 3.

Figure 5 is a sectional elevation of the arrangement shown in Figure 2 on the dotted line 4—4, Figure 3.

Figure 6 is a sectional elevation through one bearer-block and a clamping-bar and a holder-plate or base taken on a line passing through the axis of one of the clamping-screws of the kind shown in Figures 1, 2 and 3.

Figure 7 is a cross-section of a bearer-block taken on the line 7—7, Figure 12 after the lugs have been removed.

Like letters of reference refer to like parts throughout the drawings.

Figures 12, 13, 14:
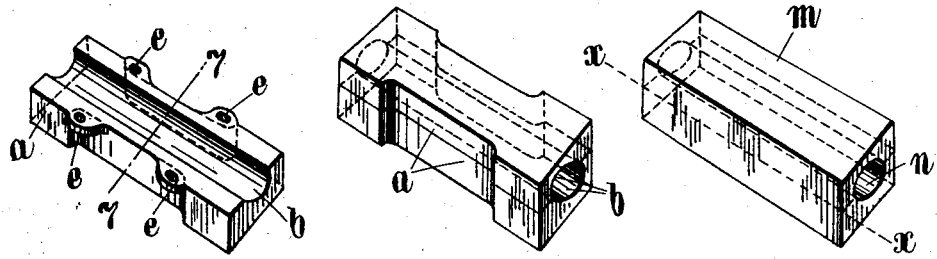
Figure 12 is a perspective view of a bearer-block.
Figure 13 is a perspective view illustrating two finished bearer-blocks.
Figure 14 is a perspective view of a piece of metal for forming two bearer-blocks.

The chief components essential for carrying this invention into practical effect are the bearer-blocks $a$, and unless these are machined without error but, the grooves $b$ in each row or set are made parallel one to the other and of the same distance away from the holder-plate $c$ (Figure 1), or $g$ (Figure 5), or the base $d$ (Figure 8), on which the said grooved bearer-blocks $a$ are mounted and secured, the resultant bearer-plate would be useless as an interchangeable unit. It is therefore important that these bearer-blocks $a$ should be machined by a method and in a manner ensuring accuracy.

Where one unit-piece of metal or material $m$ is used in making two bearer-blocks $a$, it is provided with a reamed or otherwise accurately formed hole $n$ therethrough, as shown in Figure 14. But where two separate pieces of metal or material are used in making two bearer-blocks $a$, one of which is shown as nearly finished in Figure 12, the said separate pieces of metal are each firstly provided with a plane contacting surface so that, when these contacting surfaces are placed together, the two separate pieces of metal or material can be secured together with their contacting faces in close contact by any known form of clamp, or by screws, bolts or the like, which engage or extend through clamping-lugs or protuberances $e$ (Figure 12), formed on the said separate pieces of metal or material, whilst they are being machined.

Figure 8:
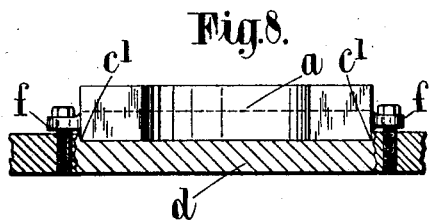
Figure 8 is a view, partly in section, showing a bearer-block located in an independent holder-plate, or base.
Figure 10:
Figures 10 and 11 are views of studs hereinafter mentioned.
Figure 9:
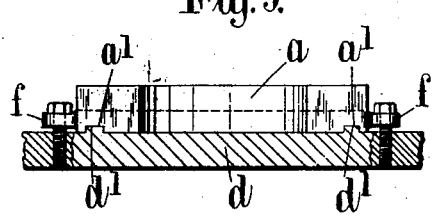
Figure 9 is a view, partly in section, showing a bearer-block located on guides.
Figure 11:

The clamping-lugs or protuberances $e$ are formed on said pieces of metal or material to facilitate holding the two pieces of metal or material during the machining thereof and are usually sawn off or otherwise removed before the bearer-blocks $a$ are mounted either on the holder-plates $c$ (Figure 4), or $g$ (Figure 5), or on the base $d$ (Figs. 8 and 9).

Whether the bearer-blocks $a$ are made in pairs from one piece of metal or material $m$, or from two separate pieces of metal or material clamped together, it is essential to form a hole $n$, centrally therethrough, and it be important that this hole $n$ is accurately bored or reamed or ground until it is both parallel and circular at which time it is ready to receive a cylinder or parallel mandrel or spindle having a diameter identical with that of the rounded bearing ends of edge-pressure-plates which are to engage in the grooves made by forming the hole $n$. After the hole $n$ is finished the said cylinder or mandrel or spindle is inserted in it so as to enable the exterior faces of all the said bearer-blocks $a$, which must be parallel to the hole $n$, to be machined in a manner as to form such of the exterior-faces as are designed in contact with any other like exterior-faces of any other bearer-block $a$, or the face of a holder-plate $c$ (Figure 4) or $g$ (Figure 5), or of a base $d$ (Figures 8 and 9), with true plane surfaces which are parallel to the said hole $n$, and to the axis of the mandrel or its equivalent on which the bearer-blocks $a$ are machined. The bearer-blocks $a$ are also machined so that two of their plane surfaces which may contact with other bearer-blocks $a$, are at right angles to the plane-surface on the bottom thereof which contacts with a holder-plate $c$ or $g$, or a base $d$. After this machining has been done the mandrel or its equivalent is removed and, in the case where one perforated piece of metal $m$ is used, such piece is sawn through or otherwise divided along the line X—X as shown in Figure 14 so as to produce two bearer-blocks $a$ therefrom, and these bearer blocks $a$, after the metal or material has been removed as the result of sawing or cutting through, each has an almost semi-circular groove $b$. These grooves $b$ would be of complete semi-circular form in cross-section if it were possible to divide the said one perforated piece of metal $m$ as shown in Figure 14 of the drawings without removing any metal in so doing.

Where two separate pieces of metal or material are clamped together and bored so that one-half of the perforation is cut into each piece of metal, as shown in Figure 13, the said two pieces of metal or material can then be clamped on to a mandrel or its equivalent and machined on their exterior-faces in a like manner to that hereinbefore described in connection with the one perforated piece of metal $m$. It is then only necessary to remove the means employed for clamping the said two separate pieces of metal or material together in order to obtain two bearer-blocks *a*, each having a complete semi-circular groove *b* in cross section. It is obvious that one bearer-block could be machined in the manner hereinbefore referred to by clamping it on the mandrel, cylinder or spindle and this is intended to be included in the spirit of this invention.

The exterior-faces of the bearer-blocks *a* of any set which contact with a holder-plate *c* or *g*, or a base *d*, when machined in the manner hereinbefore referred to, are the same distance away from the axis of the mandrel, cylinder or spindle upon which they were machined. The exterior-faces of the same set of bearer-blocks *a*, which are to contact one with the other are also machined in order that they may be at such definite distances away from and parallel to the axis of the mandrel, cylinder or spindle on which they were machined that, when they are mounted side by side in any number, or as a set, the grooves *b* thereof are then parallel one to the other and at an absolute pitch-distance apart.

Whatever combination of parts is employed to serve as a bearer-plate it is essential that the bearer-blocks *a* therefor are produced accurately; and to do this the said bearer-blocks *a* are preferably made in pairs, at one and the same time, so that their exterior-faces which may contact with other members of the bearer-plate can be finished whilst the said blocks *a* are mounted on the said mandrel, cylinder or the like, such as any machine spindle capable of being employed for the purpose.

Bearer-blocks *a* made according to this invention may be mounted on any suitably formed cylinder, mandrel or machine spindle or the like which is preferably provided with a collar and/or a locating-pin which serves to enter a recess or the equivalent in one of the unfinished bearer-blocks or, vice versa, means may be employed to prevent independent movement on the said spindle or the like, and this spindle may also be provided with any known form of screw-threaded clamping means; or, alternatively, two spindles or the like mounted in two headstocks or the like of known form may be employed during the machining of the exterior-faces of the unfinished bearer-blocks. The latter method is advantageous particularly where the length of the finished bearer-blocks *a* exceeds twice the diameter of the finished perforation *n* in the one piece of metal *m*, or in the two separate pieces of metal or material from which the said bearer-blocks *a* are made.

Bearer-plates of any desired length and employing either any desired number of bearer-blocks can be made according to this invention.

By placing bearer-blocks *a*, formed as described, side by side, they may be bolted together in any known manner and thus form a bearer-plate without the use of a holder-plate *c*, or *g*, or a base *d*, but it is not advisable to dispense with a holder-plate such as *c* or *g*, or a base *d*, except when employed to take very light loads. Therefore, when two or more bearer-blocks *a* arranged side by side, or face to face, or end to end are employed to form a bearer-plate, they are preferably held in or on an independent holder-plate such as *c* (Figure 4) or *g* (Figure 5). Alternatively the bearer blocks *a* may be held and secured directly upon a base, table, ram or other suitable part *d* of the machine in which they are incorporated, and the said bearer-blocks *a* are held in their correct position on the holder-plates *c* or *g*, or base or other parts *d* of the machine in which they are used, by means of screws, bolts or the like of the known kind, or by studs *h* (Figure 6) or *j* (Figure 5), and/or by clamping-brackets or bars *k* (Figure 6), or by other known means secured to the said holder-plates *c* or *g*, or the base or other part *d* of the machine by means such as screws *k'* (Figure 6).

The said clamping-brackets or bars *k* are provided with clamping screws *l*, and these serve to force the contacting faces of the bearer-blocks *a*, tightly together; and locknuts *p* are provided to keep the clamping-screws *l* in position.

Where an intermediate and independent holder-plate *g* is used, it is provided on its opposite faces with two plane surfaces on which the bearer-blocks *a* are mounted and secured as shown in Figures 2 and 5.

To permit the said bearer-blocks *a* to serve as journal bearings in addition to serving as bearer-blocks, caps or journal covers of the known kind may be provided and secured to the bearer-blocks *a* by means of screws, bolts or the like in any known manner.

The holder-plates *c* or *g*, may be provided in each case with a locating-groove *c'*, as shown in Figure 8, or they may be provided with locating-guides *d'* to accommodate channels or grooves *a'* formed in the bottom of the bearer-blocks *a*, as shown in Figure 9, and the said bearer-blocks *a* may be provided on their ends with lugs *f* through which bolts or screws may extend to secure the said blocks *a* to either the holder-plate *c* or *g*, or to the base *d*, as shown in Figures 8 and 9.

In producing the known form of multi-grooved bearer-plates in one piece not only is there considerable difficulty and expense in maintaining the convex cutters for so doing in a workable condition, but the presence of blow holes in the metal makes it also necessary to reject a large proportion of multi-grooved bearer-plates during the making thereof, often through defects which develop only when the final machining of one of the last grooves is being done.

Where the bearer-blocks of this invention are employed as components for use in forming bearer-plates, any defects therein usually appear during the rough boring thereof and before any expensive finishing work has begun and any defective blocks can be rejected. Therefore, an accurate and reliable bearer-plate embodying bearer-blocks made according to this invention can be manufactured more cheaply than can multi-grooved bearer-plates of the known kind.

By employing bearer-blocks $a$, and mounted on holder-plates $c$ or $g$, or on a base or the like $d$, in substitution for multi-grooved bearer-plates of the known kind, it is possible to dispense with the costly and inaccurate method of cutting grooves in bearer-plates by means of convex cutters, which convex cutters on account of the continual wear and the chipping of their cutting edges often cannot maintain a constant and original curvature for a period sufficient to accurately form a single groove, in ordinary commercial cast metal or in other material such as wood fibre or the like. The present invention has been devised to avoid this and to also avoid defects likely to occur in practice during the manufacture of bearer-plates of the known kind.

I claim:—

1. A bearer-plate comprising a base plate and grooved bearer-blocks arranged side by side on the base plate and removably attached thereto.

2. A bearer-plate comprising a base plate and grooved bearer blocks attached thereto and having the grooves therein formed by boring and reaming a cylindrical hole in a pair of blocks and separating the blocks.

3. A bearer-plate comprising a base plate, grooved bearer blocks having grooves formed therein by boring and reaming a cylindrical hole in a pair of blocks, machined exterior surfaces on the blocks in true parallelism with the axis of the hole and means for separately attaching each block to the base plate.

4. A bearer-plate comprising a base plate, grooved bearer blocks arranged side by side on the base plate, and means for securing the said blocks against displacement on the base plate in a direction transverse to the grooves.

5. A bearer-plate comprising a base plate, and interchangeable parallel-walled bearer blocks arranged closely side by side on the base plate and having longitudinal grooves of cylindrical form therein, the axes of the grooves being parallel to the planes of the sides of the blocks.

6. A bearer-plate comprising a base plate, grooved bearer blocks mounted on the said plate and means for retaining said blocks against endwise movement on the plate.

FRANK HUMPHRIS.